United States Patent
Bohnke

[19]

[11] Patent Number: 5,823,238
[45] Date of Patent: Oct. 20, 1998

[54] BACKHOE GRINDER

[76] Inventor: Dean Bohnke, 16309 Hoagland Rd., Monroeville, Ind. 46773

[21] Appl. No.: 780,504

[22] Filed: Jan. 8, 1997

[51] Int. Cl.$^6$ .................................................. A01G 23/06
[52] U.S. Cl. .......................... 144/24.12; 37/302; 144/334; 241/101.74
[58] Field of Search ................... 37/301, 302; 144/24.12, 144/34.1, 334; 241/101.74, 101.76, 101.71

[56] References Cited

U.S. PATENT DOCUMENTS

| | | |
|---|---|---|
| 68,463 | 9/1867 | Skillin et al. . |
| 3,198,224 | 8/1965 | Hiley . |
| 3,336,958 | 8/1967 | Carlton ................................ 144/24.12 |
| 3,545,509 | 12/1970 | Baxter . |
| 3,685,557 | 8/1972 | Groce .................................. 144/24.12 |
| 3,937,261 | 2/1976 | Blum .................................... 144/24.12 |
| 4,041,996 | 8/1977 | Grover ................................. 144/24.12 |
| 4,074,447 | 2/1978 | Shiver, Jr. et al. ................... 144/24.12 |
| 4,180,107 | 12/1979 | Grover . |
| 4,557,421 | 12/1985 | Probst et al. . |
| 5,158,126 | 10/1992 | Lang . |
| 5,355,918 | 10/1994 | Lang . |
| 5,499,771 | 3/1996 | Esposito et al. ..................... 144/24.12 |
| 5,501,257 | 3/1996 | Hickman . |
| 5,513,811 | 5/1996 | Hung . |
| 5,553,993 | 9/1996 | Gilbert . |

*Primary Examiner*—W. Donald Bray
*Attorney, Agent, or Firm*—Randall J. Knuth

[57] ABSTRACT

The invention pertains to a tree grinder movable from tree to tree. The invention includes a frame movable from tree to tree, a drum and a drum support rotatably mounting the drum to the frame. A hydraulic motor is attached to the drum support with a first drive pulley attached to the motor and a second drive pulley connected to the drum. A plurality of drive belts connects said first drive pulley to said second drive pulley so the motor may rotate the drum. A shredding plate is attached to the drum support and is operable to be moved toward and away from the drum thereby decreasing or increasing the size of shredded particles during grinder operation.

11 Claims, 3 Drawing Sheets

BACKHOE GRINDER

BACKGROUND OF THE INVENTION

1. Field of the Invention

The present invention relates to a machine for clearing land, and more particularly to an environment friendly attachment mounted on an excavator which grinds trees, shrubs, concrete, tree stumps and roots, and to a method of grinding standing large trees.

2. Description of the Related Art

In the past, land has been cleared for many purposes by removing tree stumps and tree roots. Large tractors have been used to remove tree stumps and roots from the ground. After removal from the ground, tree stumps and roots have been piled for burning, or they have been hauled away for disposal. Disposal at a remote location has been by burial, or by burning.

Environmental concerns, government requirements and cost have made it necessary to find other methods for clearing land. One method for land clearing is to grind tree stumps and roots into a mulch and leave the mulch in the ground where the tree stumps and roots were originally. This procedure eliminates transportation costs and disposal costs. Leaving such shredded wood and fiber mulch on the ground improves soil fertility.

Tree stump grinders have been used to grind tree stumps following the removal of a tree from areas near buildings or other areas where it is desirable to minimize disturbance of the surface.

Known stump machines generally comminute the portion of a stump that is above the ground and the portions which are near the surface. These stump grinding machines though do not operate on standing trees, only on stumps on which the majority of the standing tree portion has been previously removed. They grind up sufficient material to allow soil to cover the remaining stump and for grass to be planted. Such stump grinders generally do not remove all of a stump or tree roots. Stump grinders designed to grind the portion of a stump that is close to the surface are relatively slow. Additionally, such grinding machines have been oriented for horizontal rotation, not vertical rotation.

SUMMARY OF THE INVENTION

The invention includes a frame movable from tree to tree, a drum and a drum support rotatably mounting the drum to the frame. A hydraulic motor is attached to the drum support with a first drive pulley attached to the motor and a second drive pulley connected to the drum. A plurality of drive belts connects the first drive pulley to the second drive pulley so the motor may rotate the drum. A shredding plate is attached to the drum support and is operable to be moved toward and away from the drum thereby decreasing or increasing the size of shredded particles during grinder operation.

The invention comprises, in one form thereof a grinder for grinding items such as trees having a frame movable from location to location tree, a drum, and a drum support rotatably mounting the drum to the frame. A motor is attached to the drum support while a first drive pulley attached to the motor and a second drive pulley is connected to the drum. A plurality of drive belts drivingly connect the first drive pulley to the second drive pulley.

The invention comprises, in another form thereof, a shredding plate attached to the drum support, the shredding plate operable to be moved toward and away from said drum thereby decreasing or increasing the size of shredded particles during grinder operation. The shredding plate operates as a cover or opposing member to a portion of the rotatable drum thereby causing material to become more fully shredded when disposed between the shredding plate and rotatable drum.

An advantage of the present invention is that it is adaptable for grinding and shredding standing trees. The vertical orientation of the rotating drum permits the grinder to control the placement and ejection of shredded material. Further, the vertical orientation of the rotating drum and anchor assembly permit more options on grinding of trees independent of the workplace angle or grade. The system is able to collapse a tree and grind it while preventing the tree from falling on the operator.

Another advantage is that by the use of present invention with its adjustable shredding plate, the ground or shredded particles may be made in a selected average size.

A further advantage of the present invention is that the entire grinding system is balanced both statically and dynamically. By the use of V-belts as a drive member, in case of wear or need of replacement, no rebalancing of the system is necessary.

Yet another advantage of the present invention is that it may utilize a number of different type cutting or grinding bits depending on the material to be ground. Diamond tipped bits, flail bits attached by a pivoting connection, knife edge bits, and others may be utilized by attachment to the rotatable drum.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
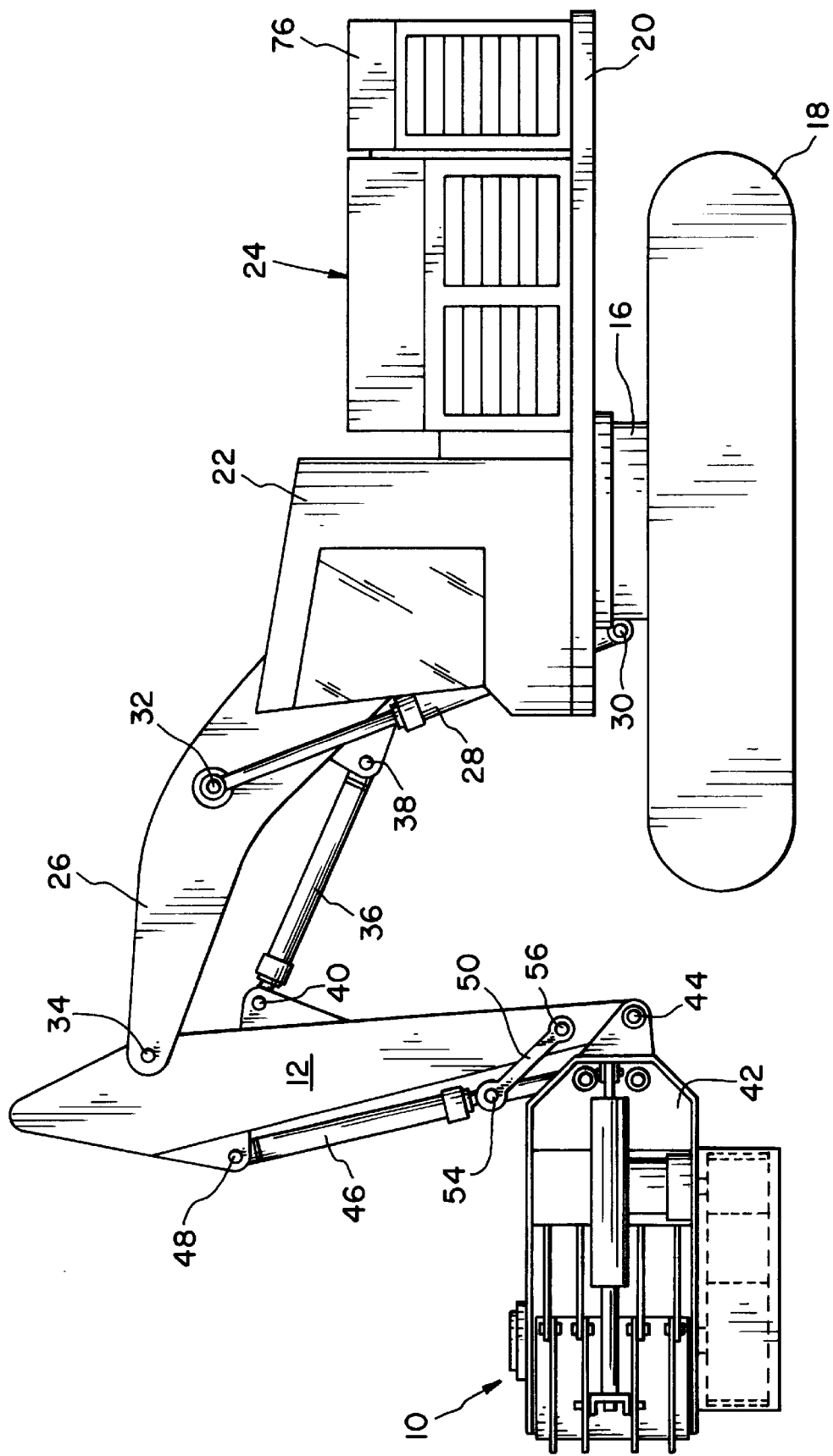
FIG. 1 is an elevational view of the grinder and backhoe of the present invention with the drum shown in a vertical orientation.

The tree stump grinder 10 is mounted on the stick 12 of an excavator or backhoe 14. The excavator 14, a portion of which is shown in FIG. 1, includes a base frame 16. The base frame 16 is supported by a pair of track assemblies 18. A swing frame 20 is connected to the base from 16 by a trunnion which allows the swing frame 20 to pivot about a generally vertical axis relative to the base frame 16. An operator's cab 22 is mounted on one side of the swing frame 20. An engine compartment 24 is also mounted on the swing frame 20. The engine compartment 24 houses an internal combustion engine. The internal combustion engine drives hydraulic oil pumps which drive the tracks and provide power to perform all the other standard excavator functions. Valves for directing hydraulic oil are controlled from the operator's cab 22.

A typical boom 26 is pivotally attached to the swing frame 20. A pair of hydraulic boom cylinders 28 are connected to the swing frame 20 by pins 30 and to the boom 26 by support pins 32. The operator can direct hydraulic oil to and from the double acting hydraulic boom cylinders 28 to pivot the boom 26 about the axis of its attachment to swing frame 20 to raise and lower the free end of the boom.

A stick 12 is pivotally attached to the free end of the boom 26 by a pivot pin 34. A double acting hydraulic stick cylinder 36 is connected to boom 26 by a pin 38 and to the stick 12 by a pin 40. A valve controlled from the operator's cab can direct oil to and from the hydraulic stick cylinder 46 to pivot the stick 12 relative to the boom 26 about the axis of the pivot pin 34.

The tree stump grinder 10 of the present invention includes a drum support such as a yoke assembly 42 which is pivotally attached to the stick 12 by a pivot pin 44. A double acting hydraulic grinder swing cylinder 46 is attached to the stick 12 by a pin 48. The hydraulic grinder swing cylinder 46 is also attached to a pair of links 50 and to links 52 by a pin 54. The links 50 are attached to the stick 12 by a pin 56. The links 52 are attached to the yoke assembly 42 by a pin (not shown). Oil can be directed by a valve, controlled from the operator's cab, to and from the hydraulic grinder swing cylinder 46 to pivot the yoke assembly 42 about the axis of the pivot pin 44. The links 50 increase the range of movement of the yoke assembly 42 about the axis of the pivot pin 44 and increase the force available to pivot the yoke assembly 42 in some portions of the yoke's range of movement. The hydraulic grinder swing cylinder 46, the links 50, and the links 52 are standard parts of an excavator 14 that normally controls a bucket attached to the stick 12 during use of the support vehicle as an excavator.

Figure 2:
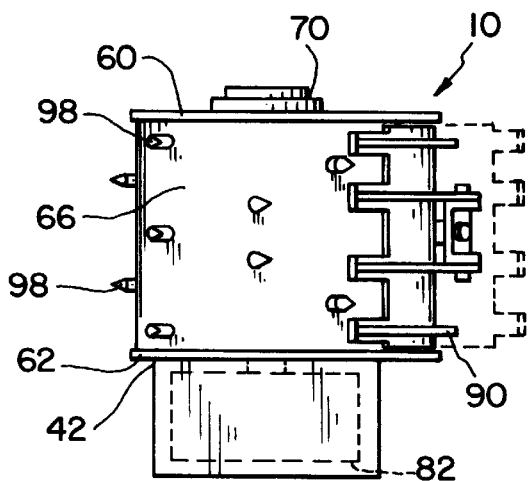
FIG. 2 is a front elevational view of the grinder module of the present invention.
Figure 3:
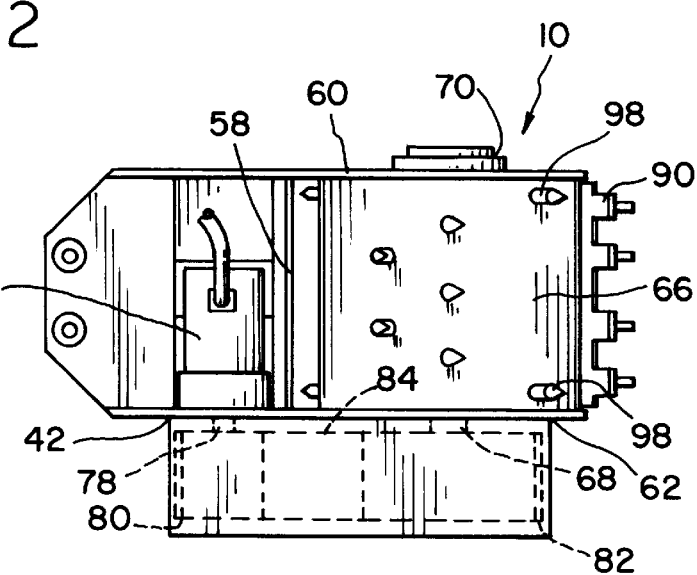
FIG. 3 is a side elevational view of the grinder of the present invention.
Figure 4:
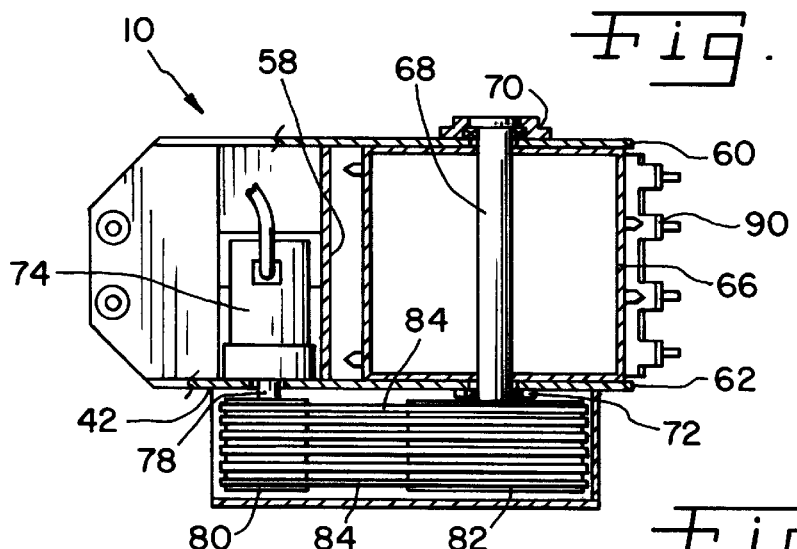
FIG. 4 is a side sectional view of the grinder of the present invention showing the plurality of drive belts.

The drum support, i.e., yoke assembly 42, as shown in FIGS. 2–4, has a main portion 58 and a pair of arms 60 and 62. A pair of plates 64, are rigidly secured to the main portion 58 of the yoke assembly 42. The plates 64 are used to attach the yoke 50 to the links 50 and stick 12.

A rotatable grinder drum 66 includes a shaft 68 therethrough. The ends of shaft 68 pass through bores in both arms 60 and 62 and connect with bearings 70 and 72 mounted thereon, respectively. The end of shaft 68 extending toward bearing 72, extends therethrough. Drum 66 has an axis for rotation that is oriented vertically during operation. Such vertical orientation permits the safe grinding of entire standing trees and stumps.

A hydraulic motor 74 is secured to a portion of yoke assembly 42, preferably to main portion 58. Hydraulic motor is in fluid communication with a source of pressurized hydraulic fluid, such as an auxiliary hydraulic pump operated by a secondary internal combustion engine 76 located within engine compartment 24 or at least on the frame portion of backhoe 14. The hydraulic fluid applied to hydraulic motor 74 is controlled by the equipment operator using valves to control the pressure and direction of fluid flow to motor 74. By reversing direction of hydraulic fluid, a reversal in the direction of rotation of motor 74 is accomplished.

Extending from hydraulic motor 74 is a shaft 78 on which is attached a first drive pulley 80. On the section of drum shaft 68 that passes through bearing 72 is attached a second drive pulley 82. The preferred type of pulley 80 and 82 is that of a multi V-belt pulley able to mount at least six, but possible more, high strength V-belts 84 thereon. Other types of belts may be utilized. A plurality of V-belts 84 are used to drivingly connect first drive pulley 80 with second drive pulley 82. Use of these belts 84 reduces shock loading of hydraulic motor 74 during use, thereby increasing its operational life. If desired, additional gearing of hydraulic motor 74 may be utilized.

A plurality of grinding, cutting or shredding bit assemblies 86 are secured to the outside surface of the grinder drum 66. Such bit assemblies may include carbide tipped bits, flail type bits and hammer bits attached for pivotable connection to the grinder drum 66.

Figure 5:
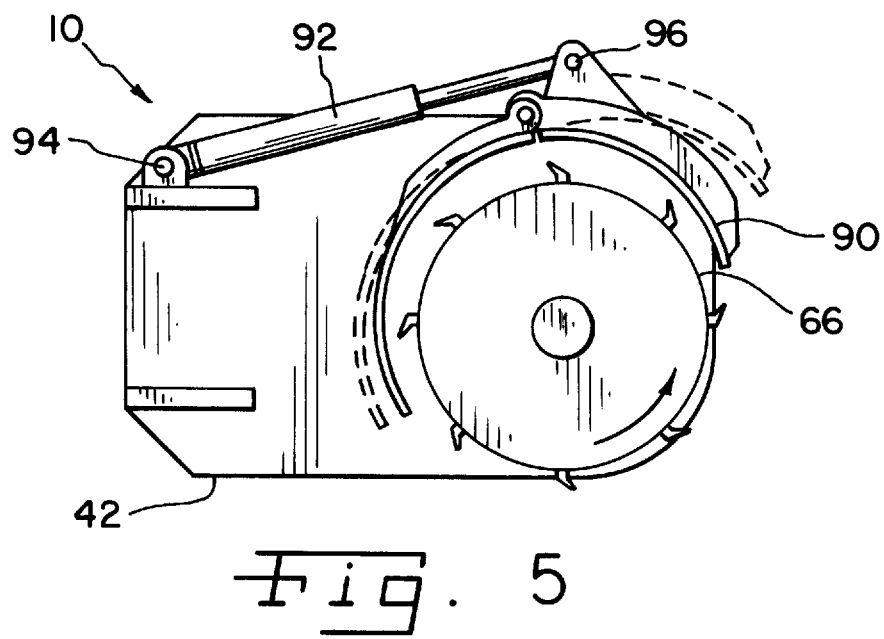
FIG. 5 is a diagrammatic view of one type of shredder plate of the present invention.

Another form of the invention includes a shredder plate 90 as best shown in FIG. 5. This curved plate 90 extends along the axial length of grinding drum and about a portion of the circumference of the drum. Preferably, plate 90 extends about more that one third the circumference of drum 66, although other amounts of coverage are possible. Plate 90 acts opposite grinding drum 66 to control the particle size of shredded material. By controlling the distance between plate 90 and drum 66, control of the average particle size of shredded material is possible.

FIG. 5 shows an embodiment of shredder plate 90 which is adjustable and controllable in its relative distance from drum 66. A hydraulic cylinder 92 is attached to both yoke assembly 42 and plate 90 by pins 94 and 96. Hydraulic cylinder 92 is connected to a supply of hydraulic pressure controlled by the equipment operator. By varying the hydraulic pressure to cylinder 92, plate 90 may be controlled in its relative distance away from drum 66. Other methods of attaching plate 90 to yoke assembly 42 may include bolts, tack welding or other manual methods where adjustment of the plate 90 may take more time. By the hydraulic control as shown, the distance between the plate 90 and drum 66 may take place on the fly, with only the operator moving a lever. For further control, plate 90 may additionally attach to yoke assembly 42 with a pivoting hinge, track slide connection or other way to increase its stability.

This plate 90 operates differently than previous "jaw" or grasping members, in that plate 90 changes the average size of shredded material and is not used to grasp items nor used as an anchor to stabilize grinder 10. The plate 90 acts as a shield to keep the grinder 10 from throwing shredded or ground material against the operator's cab during certain directions of rotation of drum 66.

The flow of hydraulic oil to and from the hydraulic motor 74 can be stopped to prevent the grinder drum 66 from rotating.

The hydraulic boom cylinders 28, the hydraulic stick cylinder 36, and the hydraulic grinder swing cylinder 46, are all connected to the hydraulic system that is standard on the excavator 14. No modifications are required in the hydraulic system to control these cylinders.

What is claimed is:

1. A tree grinder comprising:
   frame movable from tree to tree;
   a drum,
   a drum support rotatably mounting said drum to said frame, said drum having an axis for rotation that is oriented vertically during operation;
   a motor attached to said drum support;

a first drive pulley attached to said motor;

a second drive pulley connected to said drum; and a plurality of drive belts connecting said first drive pulley to said second drive pulley.

2. The tree grinder of claim 1 in which said motor is a hydraulic motor.

3. The tree grinder of claim 1 further comprising an auxiliary hydraulic power unit to drive said motor.

4. The tree grinder of claim 1 further comprising a plurality of grinding tools attached to said drum.

5. The tree grinder of claim 1 further comprising a shredding plate attached to said drum support, said shredding plate operable to be moved toward and away from said drum thereby decreasing or increasing the size of shredded particles during grinder operation.

6. A tree grinder comprising:

frame movable from tree to tree;

a drum, a drum support rotatably mounting said drum to said frame;

a motor attached to said drum support;

a first drive pulley attached to said motor;

a second drive pulley connected to said drum;

a plurality of drive belts connecting said first drive pulley to said second drive pulley; and a shredding plate attached to said drum support, said shredding plate operable to be moved toward and away from said drum thereby decreasing or increasing the size of shredded particles during grinder operation.

7. The tree grinder of claim 6 in which said motor is a hydraulic motor.

8. The tree grinder of claim 6 further comprising an auxiliary hydraulic power unit to drive said motor.

9. The tree grinder of claim 6 further comprising environmentally safe pressurized hydraulic oil used to drive said motor.

10. The tree grinder of claim 6 further comprising a plurality of grinding tools attached to said drum.

11. The tree grinder of claim 6 in which said shredder plate is hydraulically operated toward and away from said drum.

* * * * *